Dec. 8, 1925.
A. J. WILLIAMS
ROTARY MOTOR
Filed April 13, 1922
1,565,133
2 Sheets-Sheet 1
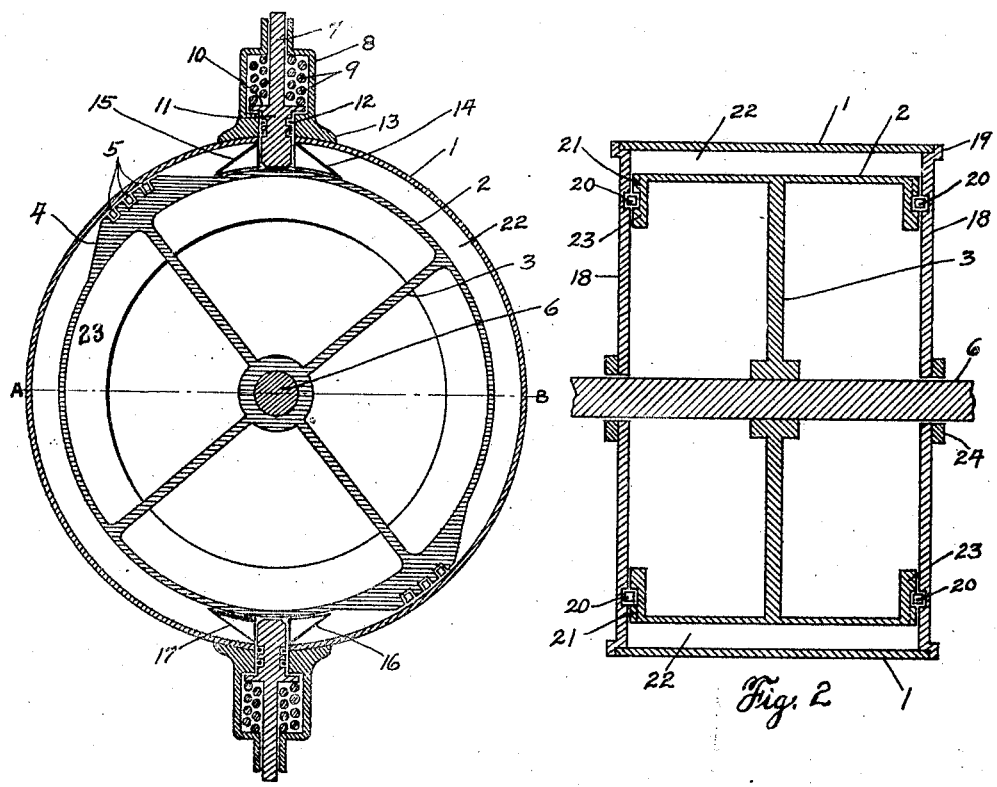
Fig. 1
Fig. 2
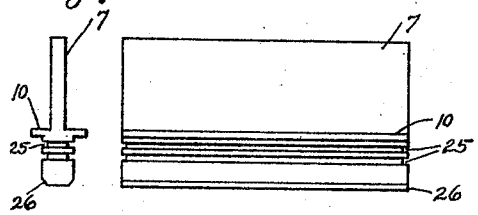
Fig. 7
Fig. 3
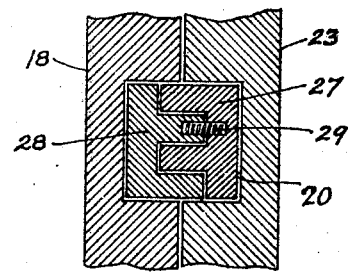
Fig. 4
WITNESSES
INVENTOR Patented Dec. 8, 1925.

1,565,133

UNITED STATES PATENT OFFICE.

ARTHUR J. WILLIAMS, OF NASHVILLE, TENNESSEE, ASSIGNOR OF ONE-FOURTH TO CHEEVER J. CAMERON, ONE-FOURTH TO WILLIAM F. GLENN, JR., AND ONE-FOURTH TO IVO B. GLENN, ALL OF NASHVILLE, TENNESSEE.

ROTARY MOTOR.

Application filed April 13, 1922. Serial No. 552,438.

*To all whom it may concern:*

Be it known that I, ARTHUR J. WILLIAMS, a citizen of the United States, residing at Nashville, in the county of Davidson and State of Tennessee, have invented certain new and useful Improvements in Rotary Motors.

This invention relates to engines, for steam, gas or oil and has special reference to rotary engines.

The main object of the invention is to provide a motor of this type of very simple construction, which will give a maximum amount of effect for a minimum amount of weight and minimum amount of fuel. Another object of the invention is to construct the motor to become a durable engine, easily accessible and having few moving parts, which engine accordingly can be manufactured at very little cost and is not liable to get out of order easily.

In the accompanying drawings like characters of reference indicate like parts in the several figures, and Fig. 1 shows a cross section of the engine with rotor and abutments;

Fig. 2 is an axial section of Fig. 1;

Fig. 3 is a front view of an abutment;

Fig. 4 is an enlarged view in section of packing rings;

Fig. 7 is an end view of Fig. 3.

Figure 5:
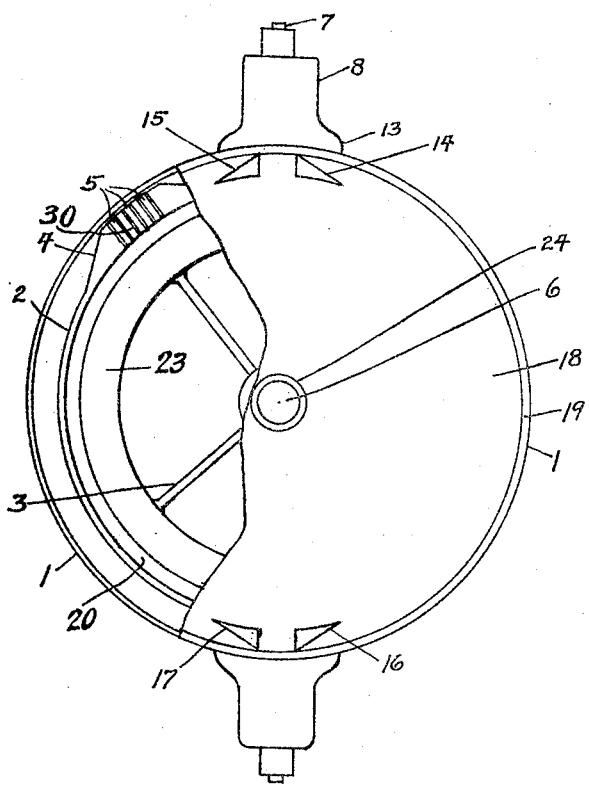
Fig. 5 is an end view of the engine with the side wall partly cut away to expose the rotor.

Reference numeral 1 represents the stator or outside housing of the engine provided with a cylindrical chamber in which a rotor 2 is mounted to revolve on a shaft 6 carried in bearings 24 in the side plates 18 of the stator. The rotor 2 is provided with spokes 3 rigidly connecting it with the shaft 6 and reference numeral 4 represents the fixed pistons formed integral with the rotor 2 and positioned at diametrically opposite points of the rotor. The latter is of smaller diameter than the chamber in the stator 1, so that steam chambers 22 are formed between the interior periphery of stator 1 and the exterior periphery of rotor 2, while the pistons 4, which are tapering on both sides to form a ridge, bridges the space that constitutes the steam chamber 22 as best seen in Fig. 1.

Figure 6:
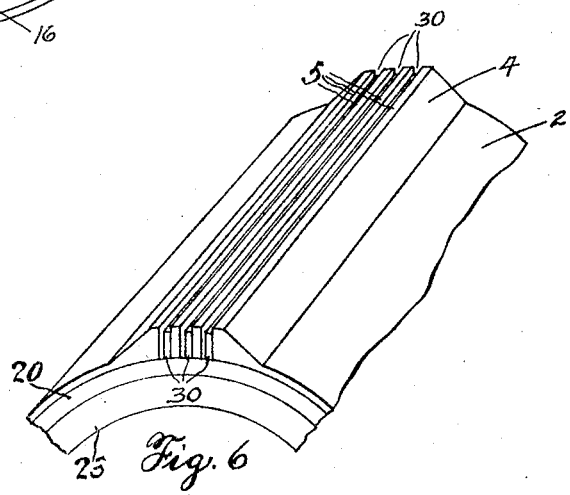
Fig. 6 is a fragmentary perspective view of the rotor showing the piston portion thereof.

Along the ridge formed in each abutment 4, one or more grooves 5, running from end to end of the piston, are provided, terminating with substantially radial end grooves 30 in the piston. In Figs. 1, 5 and 6, three of these grooves are shown, but it is evident that this number may be increased or decreased as most suitable for a particular engine. The ridge portions of the pistons 4 do not contact with the inner periphery of the stator 1, but in order to prevent the steam from escaping past the pistons at this point, the grooves 5 and 30 are filled with suitable packings, between which and the piston are inserted springs to press them against the inner periphery of the stator.

At diametrically opposite sides of the stator 1, are provided housings 8 with shoulders 13 by means of which they are attached to the stator. In the hollow part of each housing 8, is deposited a sliding abutment or gate 11 with an outwardly extending shank 7 projecting through the housing. Within this hollow portion are deposited compression springs 9 engaging at one end with the housing and at the other end with the flanges 10 on the gate in such a manner that the gate is pressed in radial direction against the rotor 2 as seen in Fig. 1. Along the sides of the sliding abutment or gate 11 are formed grooves or slots 25 reaching from end to end of the gate on both sides thereof and continuing across the narrow ends, as seen in Figs. 3 and 7. The inner ends of the gate are shown beveled at 26 in order to prevent cutting of the rotor and to permit the easy running up of the sliding abutment or gate over the slanting sides of the pistons 4.

In the grooves 25 are deposited packings 12 forming a tight joint between the sliding abutment or gate and the sides of the housing 8.

It will be noted that this construction permits the pressing of the sliding abutments or gates against the rotor and that the gates will be lifted only when the pistons 4 pass them. In this manner no cam device is necessary to operate the sliding abutments or gates, which continually contact with the surface of the rotor. This construction being particularly suitable for smaller engines.

Reference numerals 15, 16, and 14, 17 represent, respectively intake and exhaust ports, a pair of which are provided at each end in the side plates 18 of the stator and symmetrically situated as regards the sliding abutments or gates 11. It will be evident that in this manner, with two sliding abutments or gates as shown in Figs. 1 and 5, there will be altogether eight ports, that is, four intake ports 15 and 16 and four exhaust ports 14 and 17.

The end plates 18 are preferably detachable from the body of the stator and secured thereto as at 19 in any suitable manner preferably by bolts to form steam tight joints.

At each end of the rotor 2 is furnished an annular flange 23 directed inwardly, in which is formed an annular groove 20, the adjacent side plate 18 having corresponding grooves. In these groves are inserted packing rings, which consist of two mating halves 27 and 28 having interengaging flanges and springs 29 adapted to push the halves apart as best seen in Fig. 4. The grooves 20 in the annular flanges 23 of the rotor preferably communicate with the radial slots 30 at each end of the pistons 4, see Fig. 6. By means of this arrangement an effective tight joint is provided on all sides between the rotor and the stator, so that there is no chance for the steam to escape either past the pistons or the ends of the rotor.

It will be noted that the intake and exhaust ports are of triangular shape, so that, when the sliding abutments or gates are lifted by the fixed pistons 4 in central position, the latter will entirely cover both intake and exhaust ports at this point. The sloping sides of the fixed pistons are for that reason parallel with the outer sides of the ports, when the fixed pistons and the gates stand in alinement.

In the operation of this rotor, steam is admitted through the intake port 15 directly the ridge of the piston 4 has passed the gate or sliding abutment 11, which at this time is riding over the piston. This steam will then act between the rear side of piston and the forward side of the sliding abutment or gate 11 in the chamber 22 and compel the rotor to revolve in counter-clockwise direction. Through the contacting of the sliding abutment or gate 11 with the rear slope of the fixed piston 4, the exhaust port 14 will be kept closed for this steam, so that it cannot back out through port 14. As, however, the exhaust port 17, which is situated ahead of the advancing fixed piston 4, is open, the spent steam between this piston and the exhaust port 17 will be driven out through the latter.

This rotor may be reversed by admitting steam through ports 14 and 17 and exhausting it through ports 15 and 16, for which purpose a two-way valve may be provided of any suitable construction and forming no part of the present invention.

The exhaust and intake ports stand open at all times except when closed by the action of the pistons on the rotor while passing the ports.

Having thus described the invention, what is claimed as new is:

1. In a rotary engine, the combination of a cylindrical stator having side plates, a cylindrical rotor journaled in the stator and having annular end flanges, pistons on the rotor to cooperate with the stator, sliding abutments on the stator to cooperate with the rotor, said flanges and said end plates being provided with registering annular grooves, mating interfitting annular packing rings accommodated in said grooves, said rings being each substantially F-shaped in cross section, and springs confined between the rings pressing said rings apart.

2. In a rotary engine, the combination of a cylindrical stator having side plates, a cylindrical rotor journaled in the stator and having annular end flanges, the rotor defining an intervening cylindrical chamber between the rotor and stator, pistons on the rotor accommodated in said chamber to cooperate with the stator and arranged symmetrically as regards a radial plane, the pistons being formed with sloping sides, radial spring-pressed sliding abutments carried by the stator to cooperate with the rotor and mounted diametrically opposite each other, housings on the stator for said abutments, pairs of ports in the side plates of the stator and symmetrically situated as regards a radial plane through said sliding abutments, said ports having sloping sides disposed to coincide with the sides of the pistons when said radial planes coincide whereby said ports are simultaneously closed by said pistons, the flanges of the rotor and the side plates of the stator being provided with registering annular grooves, mating interfitting annular packing rings accommodated in said grooves, said rings being each substantially F-shaped in cross section, and springs confined between the rings pressing said rings apart.

A. J. WILLIAMS.